United States Patent [19]

Fischer et al.

[11] 4,010,514
[45] Mar. 8, 1977

[54] ARRANGEMENT FOR CONTINUOUSLY CLEANING FLEXIBLE LAYER SUBSTRATES IN TAPE FORM

[75] Inventors: Josef Fischer; Johann Baarfüsser; Helmut Maier, all of Munich, Germany

[73] Assignee: AGFA-Gevaert, A.G., Leverkusen, Germany

[22] Filed: Mar. 31, 1975

[21] Appl. No.: 563,504

[30] Foreign Application Priority Data

Apr. 4, 1974 Germany ............................ 2416419

[52] U.S. Cl. .............................. 15/306 A; 15/100; 134/9; 134/21; 360/137
[51] Int. Cl.² ............................................ B08B 5/04
[58] Field of Search ............ 134/9, 15, 21; 427/129, 427/322, 326, 444; 15/306 A, 100; 100/90, 156, 168; 360/137; 162/205, 358, 360 R, 368, 369, 371, 372, 374

[56] References Cited

UNITED STATES PATENTS

| 1,120,432 | 12/1914 | Atkins | 162/369 |
|---|---|---|---|
| 1,880,691 | 10/1932 | Berry | 162/369 X |
| 2,209,759 | 7/1940 | Berry | 162/371 X |
| 2,532,910 | 12/1950 | Hayward | 15/306 A X |
| 2,905,767 | 9/1959 | Eckert, Jr. et al. | 134/9 UX |
| 3,097,995 | 7/1963 | Beachler | 162/371 |
| 3,266,196 | 8/1966 | Barcaro | 134/9 X |
| 3,475,782 | 11/1969 | Teuber | 15/100 X |

Primary Examiner—S. Leon Bashore
Assistant Examiner—Richard V. Fisher
Attorney, Agent, or Firm—Connolly and Hutz

[57] ABSTRACT

The arrangement is used for continuously cleaning surface-sensitive paper or film in web form. The arrangement may be installed at any point along the path of web travel. The cleaning effect is provided by a ribbon of fibrous nonwoven material which is guided over a suction roller together with the web to be cleaned. The ribbon of fibrous nonwoven material moves in the opposite direction to the web. A highly satisfactory cleaning effect is obtained by the high relative speed between the surface to be cleaned and the web of nonwoven material. The particles of dust and dirt removed from the web are drawn into the suction roller under the effect of the vacuum.

6 Claims, 4 Drawing Figures

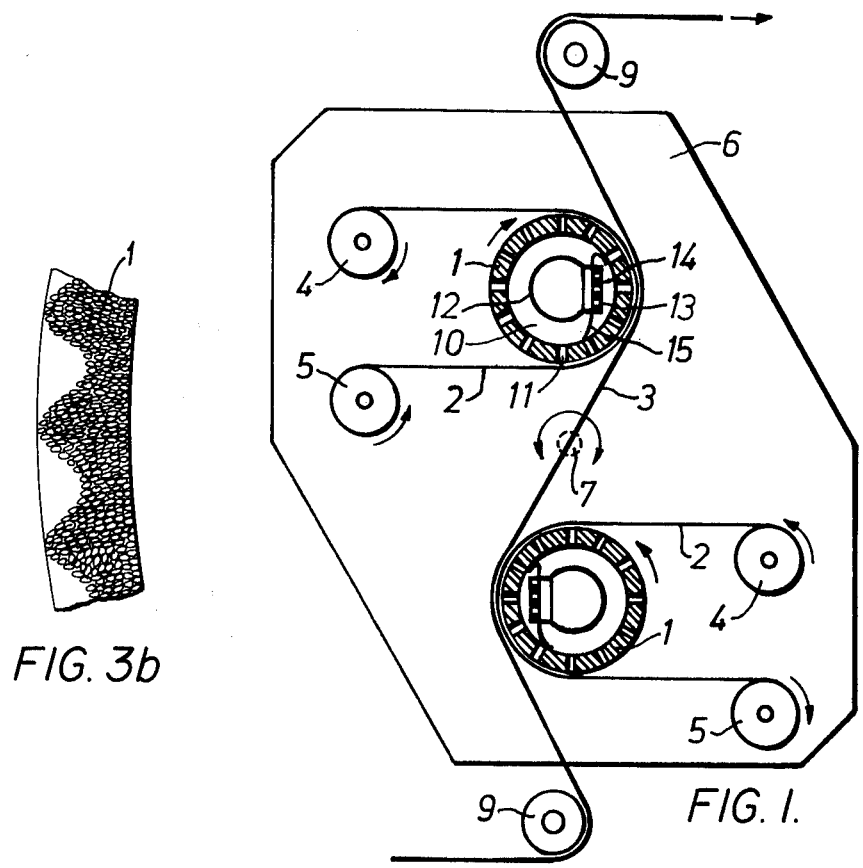
FIG. 3b
FIG. 1.
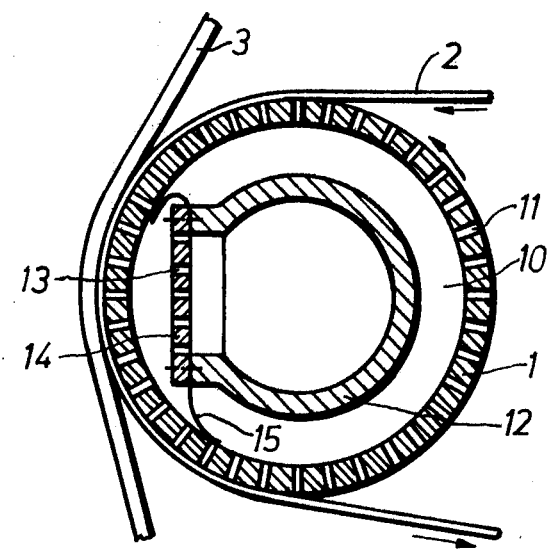
FIG. 2.
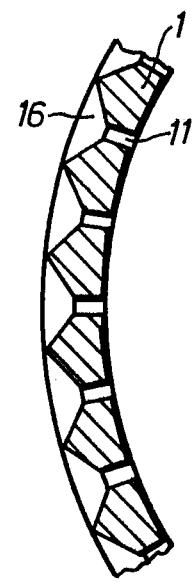
FIG. 3a.

ARRANGEMENT FOR CONTINUOUSLY CLEANING FLEXIBLE LAYER SUBSTRATES IN TAPE FORM

This invention relates to an arrangement for continuously cleaning surface-sensitive paper or film in web form, and is especially concerned with photographic materials and sound recording tapes. The basic principle of arrangements of this kind is that the surface to be cleaned is brought into contact with and wiped by a brush-like or fleece-like material.

In the production of photographic materials, for example in the coating of a flexible web of paper or film with a photosensitive silver halide emulsion, even very small particles of dust result in so-called "comets" which seriously affect the quality of the photographs ultimately produced. The complete absence of dust is also an important requirement in the manufacture of magnetic tapes. Accordingly, production has to be carried out in air-conditioned, dust-free rooms. However, it has been found that, in spite of these precautions, drop-outs still occur in magnetic tapes. Drop-outs are almost always attributable to the deposition of foreign bodies, such as fibres or dust, on the surface of the tape just before coating. Accordingly, the webs of film to be coated have to be cleaned once again before coating.

It is known that flexible webs of paper or film can be cleaned by means of rotating brushes and rinsed with washing liquid. In many cases, ultrasonic vibrations are used to promote the cleaning effect. This method of cleaning necessitates subsequent drying, and it is totally unsuitable for certain materials, for example paper.

Instead of washing liquids, a powerful stream of air can also be used for cleaning. In this case, static charging is prevented by a corona discharge unit.

In another cleaning arrangement, the web of paper or film is brought into contact with cloths soaked with paraffin, the invention being that particles of dust adhering to the web are picked up by those cloths. Unfortunately, the surface of the web is liable to become soiled with traces of paraffin; resulting in drastic changes in its wetting properties.

An object of the present invention is to provide an arrangement for continuously cleaning, and removing dust from, paper or film in web form which satisfies the very stringent requirements in the production of highly sensitive photographic materials and magnetic tapes.

According to the invention there is provided an arrangement for continuously cleaning surface-sensitive webs comprising:
 at least one suction roller over which a ribbon of fibrous nonwoven material is guided:
 means for guiding the web in contact with the ribbon past the suction roller and pressed there against under the effect of tension prevailing in the web; and
 means for causing the said ribbon and the web to travel in opposite directions.

The rate of travel of the fibrous ribbon is considerably below the speed of the travelling web. A ratio of from 1 : 500 to 1 : 10,000 has proved to be effective for ration between the rate of travel of the fibrous ribbon the and rate of travel of the web, respectively.

Under the effect of the reduced pressure prevailing in the vicinity of the suction roller, dust particles from the surface of the web are drawn into the fibrous ribbon from which they are completely removed under suction over a period of time. Each suction roller preferably comprises an outer, rotating hollow cylinder which is formed with bores distributed over its entire surface, and a fixed suction duct inside the suction roller which is only provided with bores in the vicinity of the looping angle. Instead of using a hollow cylinder with bores in its surface, it is alternatively possible to use a hollow cylinder of a porous, air-permeable sintered material.

The bores in the hollow cylinder and also in the evacuation duct preferably widen conically outwards to enable particles of dust allowed through by the nonwoven ribbon to be more effectively sucked into the roller.

In order to obtain a better air distribution for bringing the nonwoven ribbon into contact with the roller, the outer hollow cylinder may be additionally provided over its surface with grooves extending transversely of the direction of web travel.

In advantageous embodiment of the suction roller the space between the evacuation duct and the hollow cylinder in the vicinity of the looping angle, has flexible sealing flaps arranged therein on either side of the evacuation duct adjoining the surface provided with bores. The free ends of the sealing flaps are in contact with the inside of the hollow cylinder and seal off from the atmosphere the intermediate space under reduced pressure in the vicinity of the looping angle.

A take-off roll and take-up roll for the ribbon of fibrous nonwoven material are advantageously situated in the vicinity of the suction roller. Accordingly, the ribbon of fibrous nonwoven material travels continuously from the take-off roll over the suction roller to the take-up roll during the cleaning process.

Advantageously both the front and back surfaces of the web are cleaned. To this end, a double-sided cleaning arrangement has been developed. In this arrangement, suction rollers with a take-up roll and take-off roll are arranged immediately after one another on either side of the web. In this case, the two cleaning units are mounted on a common-base plate in such a way that they can be swung away from the web by rotating the base plate.

The invention has the advantage of increased cleaning effectiveness. Particles of dust are removed under suction, and are thus unable to find their way back on to the surface of the web. In addition, the surface of the web is treated very gently. There is little danger of scratching, in contrast to the majority of conventional cleaning systems. Neither does the web undergo any changes in its physical properties (e.g., adhesion wetting) at its surface.

One embodiment of the invention is described by way of example in the following with reference to the accompanying drawings, wherein:

FIG. 1 is a diagrammatic cross-section through a cleaning arrangement for the front and back surfaces of a web.

FIG. 2 is a cross-section through the suction roller.

FIG. 3a is a partial elevation in cross section of one embodiment of the outer hollow cylinder.

FIG. 3b is a partial cross-sectional view in elevation of a sintered form of the hollow cylinder shown in FIG. 3a.

Cleaning units for the front and back surfaces of the tape are shown in FIG. 1. Each cleaning unit consists of a suction roller 1 around which a flexible ribbon 2 of fibrous nonwoven material is looped. The ribbon 2 travels from a take-off roll 4 to a take-up roll 5 in the opposite direction to the direction of movement of the web 3 to be cleaned. The take-off roll 4 and take-up roll 5 are provided with a common drive (not shown). The rate of travel of the fibrous ribbon is very low relative to that of the web 3 of paper or film. The ratio between the respective rates of travel is between 1 : 500 and 1 : 10,000, in other words for a rate of web travel of, for example 100 meters per minute, the rate of travel of the fibrous ribbon 2 is only 1 to 20 cm per minute.

Both suction rollers 1 are mounted on a base plate 6 which is rotatable about a pivot 7 (perpendicular to the plane of the paper). By changing the position of the base plate 6 relative to the web 3, it is possible to adjust the contact pressure of the web 3 on the suction rollers and the ribbons 2 of fibrous nonwoven material lying beneath them. In addition, the contact pressure may also be varied by laterally displacing web guide rollers 9 outside the base plate 6.

The suction roller 1 shown in FIG. 2 consists of the outer hollow cylinder 10 which is rotatably mounted on a fixed, concentric inner tube 12. The rotatable outer hollow cylinder 10 is provided over its entire surface with radial slots or bores 11. The fixed inner tube 12, which constitutes an evacuation duct, also has slots or bores 13 in the region nearest the web/ribbon contact zone and is connected to a vacuum pump. In this way, a reduced pressure is maintained inside the hollow cylinder in the region where the web 3 loops arounds the roller 1. As a result, particles of dust do not accumulate in the fibrous ribbon, but instead are removed by the vacuum pump. That part of the evacuation duct 12 provided with the bores 13 is in the form of a plate 14. Flexible sealing foils 15, for example of polyethylene terephthalate, are fixed to the ends of the plate. They seal off from the atmosphere the inner space between the plate and the hollow cylinder. The reduced pressure in the inner space, which is maintained by the vacuum pump, amounts to approximately 100 m water.

In order to obtain more effective removal of the dust particles into the evacuation duct 12, the bores 11 in the hollow cylinder 10 can have outwardly widening frusto-conical portions 16 and terminate in longitudinal grooves (see FIG. 3a). The surface of the roller then has a tooth-like profile. Instead of using a hollow cylinder 10 formed with outwardly widened conical bores 11, it would alternatively be possible to use a hollow cylinder of porous air-permeable sintered material, for example sintered bronze (FIG. 3b).

The ribbon 2 of fibrous nonwoven material may consist of natural fibres, man-made natural polymer fibres or man-made synthetic polymer fibres with a fineness of preferably 0.5 to 5 den. It is possible to use fibrous nonwoven materials of polyamide, polyester, polyolefin, polyvinyl chloride, cellulose or cotton or mixtures thereof, depending upon the surface hardness of the material to be cleaned. Nonwoven materials of crimped fibres preferentially oriented transversely of the web 1 are particularly suitable. When the roll of ribbon 2 is emplty, it is replaced by a new roll. However, the consumption of material is low because of the low rate of travel of the ribbon 2.

We claim:

1. A suction roller arrangement for continuously cleaning surface-sensitive paper or film in web form movably disposed in a path of travel under tension, more especially photographic material and magnetic tapes, said arrangement including a cleaning surface of a travelling flexible ribbon material being in contact with a portion of the web surface to be cleaned, the other surface of the travelling flexible ribbon material being pressed in contact with the suction roller as the web portion passes under tension thereover, the travelling flexible ribbon material being non-woven and fibrous, and means for directing the travel of the flexible ribbon of fibrous non-woven material at a speed $V_1$, in the opposite direction to the direction of the web which travels at a speed $V_2$, the ratio between the respective rates of travel $V_1:V_2$ being between about 1 : 500 and 1 : 10,000, wherein the suction roller includes an outer hollow cylinder, the outer hollow cylinder of the suction roller having bores which are distributed over the entire peripheral surface thereof, and wherein an evacuation duct is arranged inside the suction roller and spaced at a sufficient distance from the hollow cylinder of the suction roller to provide a uniform suction effect on the ribbon in contact therewith, the evacuation duct being provided with bores only in the vicinity of the web portion and ribbon pressed in contact with the suction roller.

2. A suction roller arrangement as set forth in claim 1 wherein the outer hollow cylinder of the suction roller comprises porous sintered material.

3. A suction roller arrangement as set forth in claim 1 wherein the bores of the hollow cylinder are widened conically outwardly to form a sawtoothed roller profile.

4. A suction roller arrangement as set forth in claim 1 wherein the surface of the hollow cylinder additionally comprises grooves extending transversely to the direction of travel of the web surface being cleaned.

5. A suction roller arrangement as set forth in claim 1 wherein a suction chamber is defined in an intermediate space between the evacuation duct and the inside of the hollow cylinder by flexible sealing flaps which are connected on both sides of the evacuation duct adjoining the portion with bores, and the flexible sealing flaps having free ends which are in sliding contact with the inside of the hollow cylinder.

6. A suction roller arrangement as set forth in claim 1 wherein a pair of the suction rollers are provided, the means for directing travel of the flexible ribbon comprising a take-up and a take-off roll for each suction roller, each suction roller being associated with a separate ribbon of fibrous nonwoven material extending between the take-up and the take-off roll thus forming a cleaning unit, the pair of suction rollers being provided for cleaning both surfaces of the web, and the pair of cleaning units being mounted on a base plate having a pivot disposed between the pair of cleaning units to permit the pair of cleaning units to be swung towards and away from the web by rotating the base plate.

* * * * *